(12) United States Patent
Boast et al.

(10) Patent No.: US 7,282,140 B2
(45) Date of Patent: Oct. 16, 2007

(54) SUMP FILTER WITH FILTER ELEMENT CARTRIDGE

(75) Inventors: Andrew J. Boast, deceased, late of Fontana, WI (US); by William L. Boast, legal representative, Bloomington, IN (US); Larry Larkin, Lake Geneva, WI (US)

(73) Assignee: Filtertek Inc., Hebron, IL (US)

( * ) Notice: Subject to any disclaimer, the term of this patent is extended or adjusted under 35 U.S.C. 154(b) by 588 days.

(21) Appl. No.: 10/932,887

(22) Filed: Sep. 2, 2004

(65) Prior Publication Data

US 2005/0087481 A1    Apr. 28, 2005

Related U.S. Application Data

(63) Continuation-in-part of application No. 10/087,119, filed on Mar. 1, 2002, now abandoned.

(60) Provisional application No. 60/273,169, filed on Mar. 2, 2001.

(51) Int. Cl.
    *B01D 35/14*    (2006.01)
(52) U.S. Cl. ............... 210/130; 210/167.08; 210/416.5
(58) Field of Classification Search ........... 210/167.08, 210/416.5, 250, 130; 123/196 A
    See application file for complete search history.

(56) References Cited

U.S. PATENT DOCUMENTS

| | | |
|---|---|---|
| 2,057,779 A | 10/1936 | Jacobs |
| 2,418,247 A | 4/1947 | Dalzell |
| 2,471,803 A | 5/1949 | Wasserman |
| 3,310,173 A | 3/1967 | Sosower |
| 3,382,984 A | 5/1968 | Kuss |
| 3,688,908 A | 9/1972 | Myers et al. |
| 3,841,489 A | 10/1974 | Combest et al. |
| 4,052,315 A | 10/1977 | Lindsay, Jr. et al. |
| 4,228,012 A | 10/1980 | Pall |
| RE30,779 E | 10/1981 | Cooper |
| 4,402,827 A | 9/1983 | Joseph |

(Continued)

FOREIGN PATENT DOCUMENTS

CA         2374098         9/2002

(Continued)

OTHER PUBLICATIONS

Hawley's Condensed Chemical Dictionary (Lewis, Richard J., Sr., 13th edition, pp. 811-812, for properties of nylon), not dated.

*Primary Examiner*—Terry K. Cecil
(74) *Attorney, Agent, or Firm*—Brinks Hofer Gilson & Lione

(57) ABSTRACT

A sump filter assembly wherein a filter element that may or may not be removably disposed in a filter housing is sealingly engaged with the filter housing by way of a sealing member to separate the filter housing cavity between dirty and clean spaces. The filter element is provided with filtration material with a portion thereof embedded in the filter element, the filter element is further provided with a sealing member retaining shoulder to ensure proper placement of the sealing member in the assembly, with the sealing member being an O-ring or gasket member, among other things, and a bypass valve for cold flow of transmission fluid is optionally provided.

40 Claims, 10 Drawing Sheets

U.S. PATENT DOCUMENTS

| | | |
|---|---|---|
| 4,608,166 A | 8/1986 | Cain |
| 4,640,771 A | 2/1987 | Whalen et al. |
| 4,826,598 A | 5/1989 | Cain |
| 4,828,694 A | 5/1989 | Leason |
| 4,839,041 A | 6/1989 | Kuwayama et al. |
| 4,889,621 A | 12/1989 | Yamada et al. |
| 4,985,142 A | 1/1991 | Laycock et al. |
| 5,049,271 A | 9/1991 | Cain |
| 5,312,546 A | 5/1994 | Janik |
| 5,494,575 A | 2/1996 | Kitajima et al. |
| 5,533,478 A | 7/1996 | Robinson |
| 5,534,145 A | 7/1996 | Platter et al. |
| 6,105,789 A | 8/2000 | Boast |
| 6,539,912 B1 | 4/2003 | Beer |

FOREIGN PATENT DOCUMENTS

| | | |
|---|---|---|
| DE | 197 35 444 A1 | 1/1999 |
| FR | 2471803 | 6/1981 |
| GB | 2171024 A | 8/1986 |

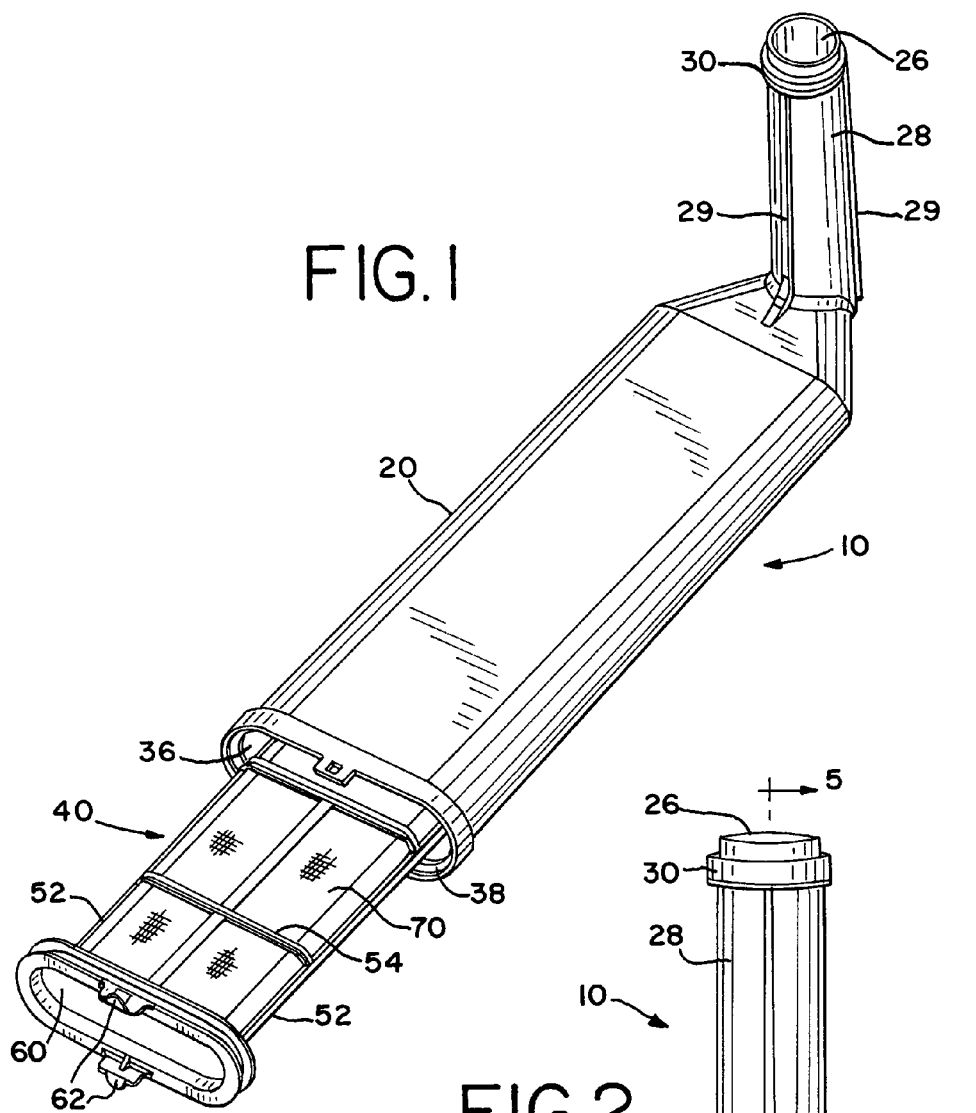
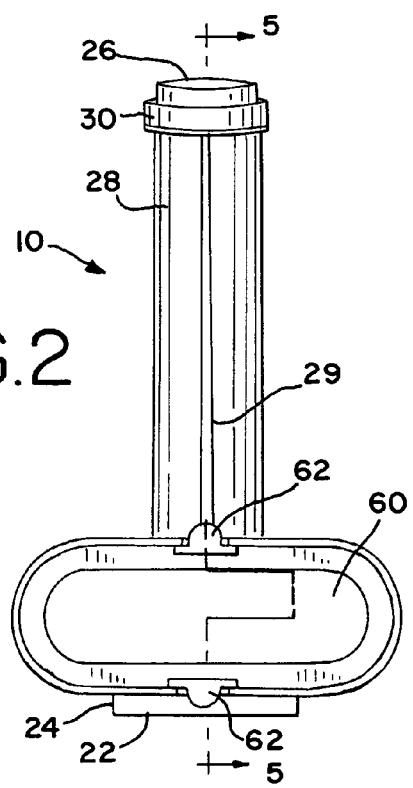

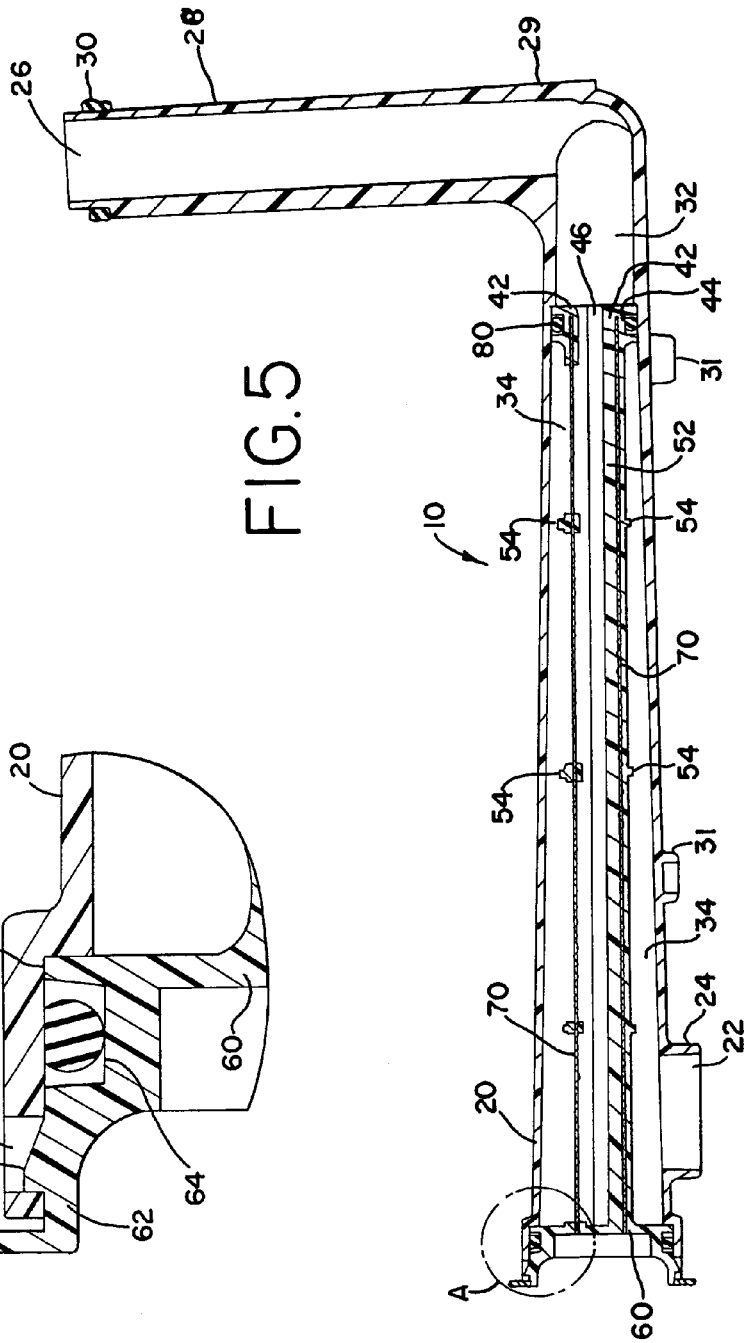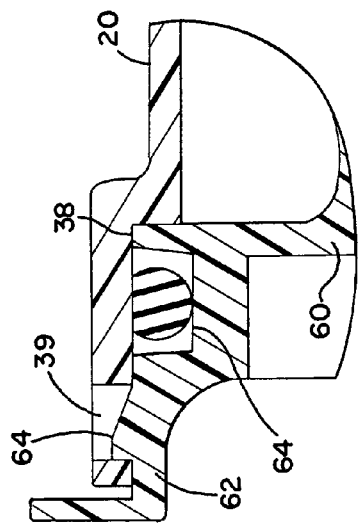

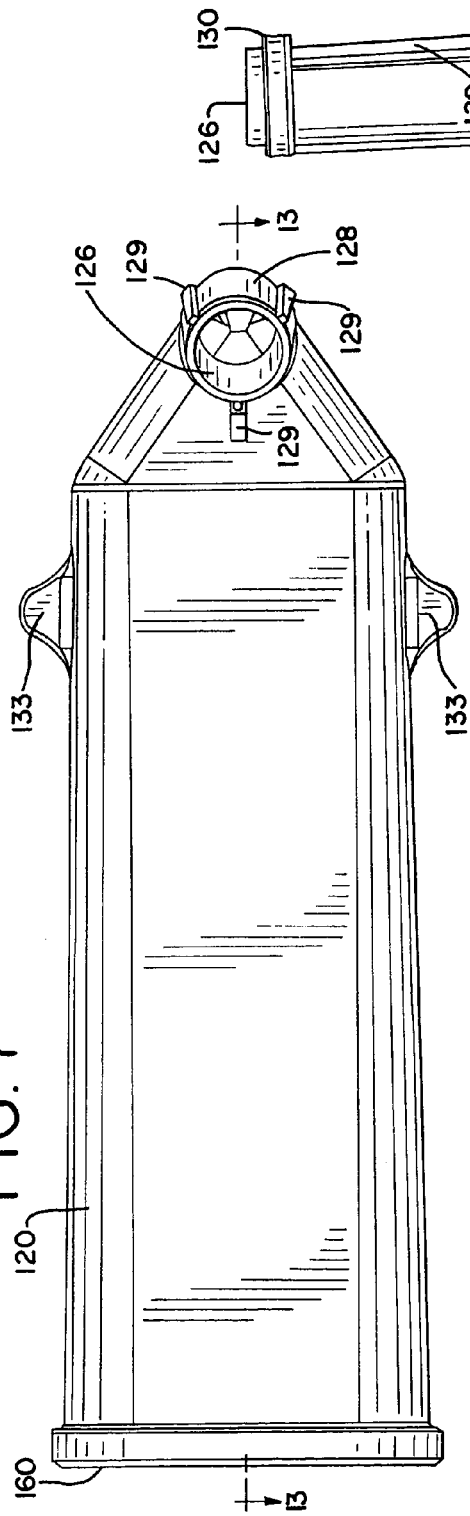
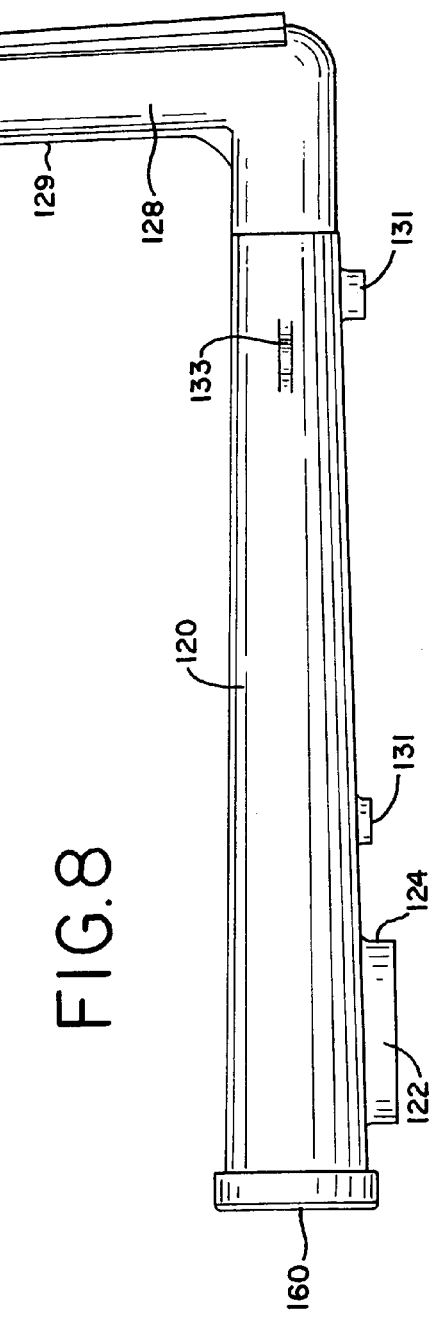
FIG. 7
FIG. 8

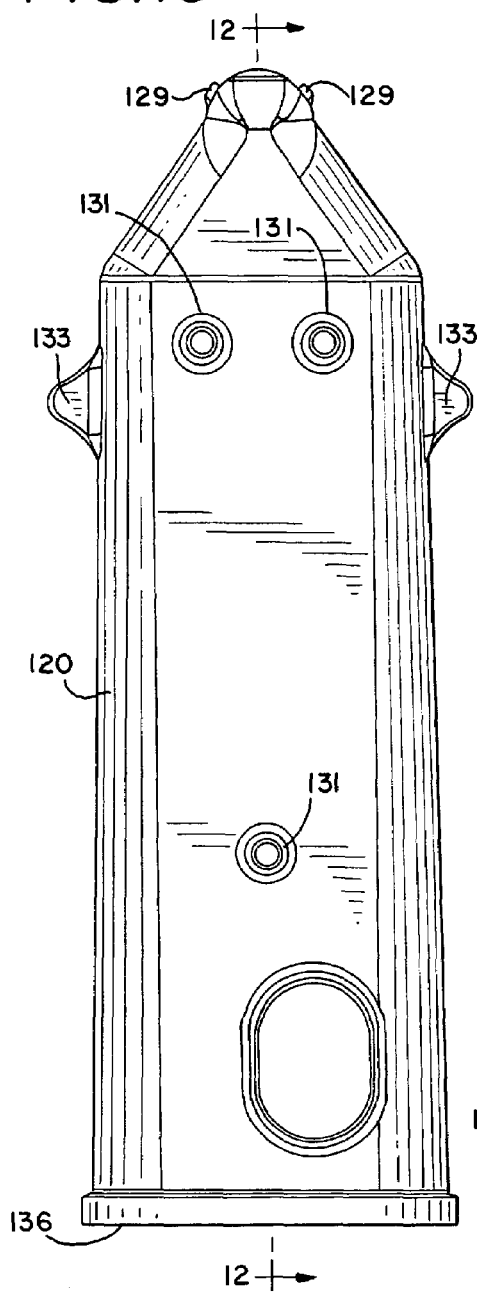
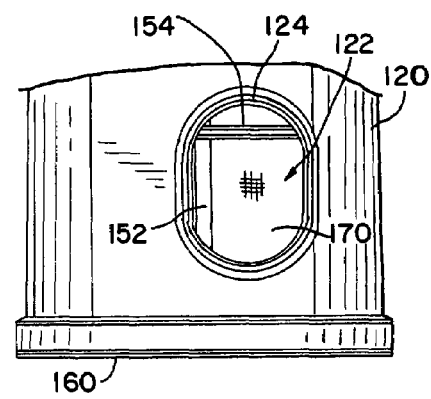
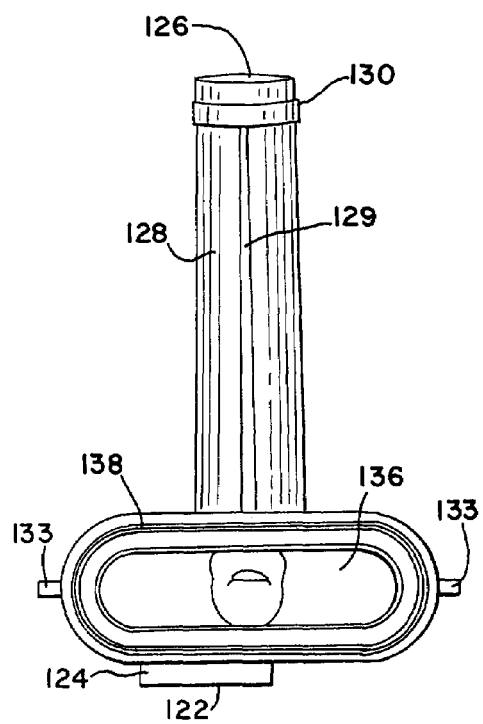

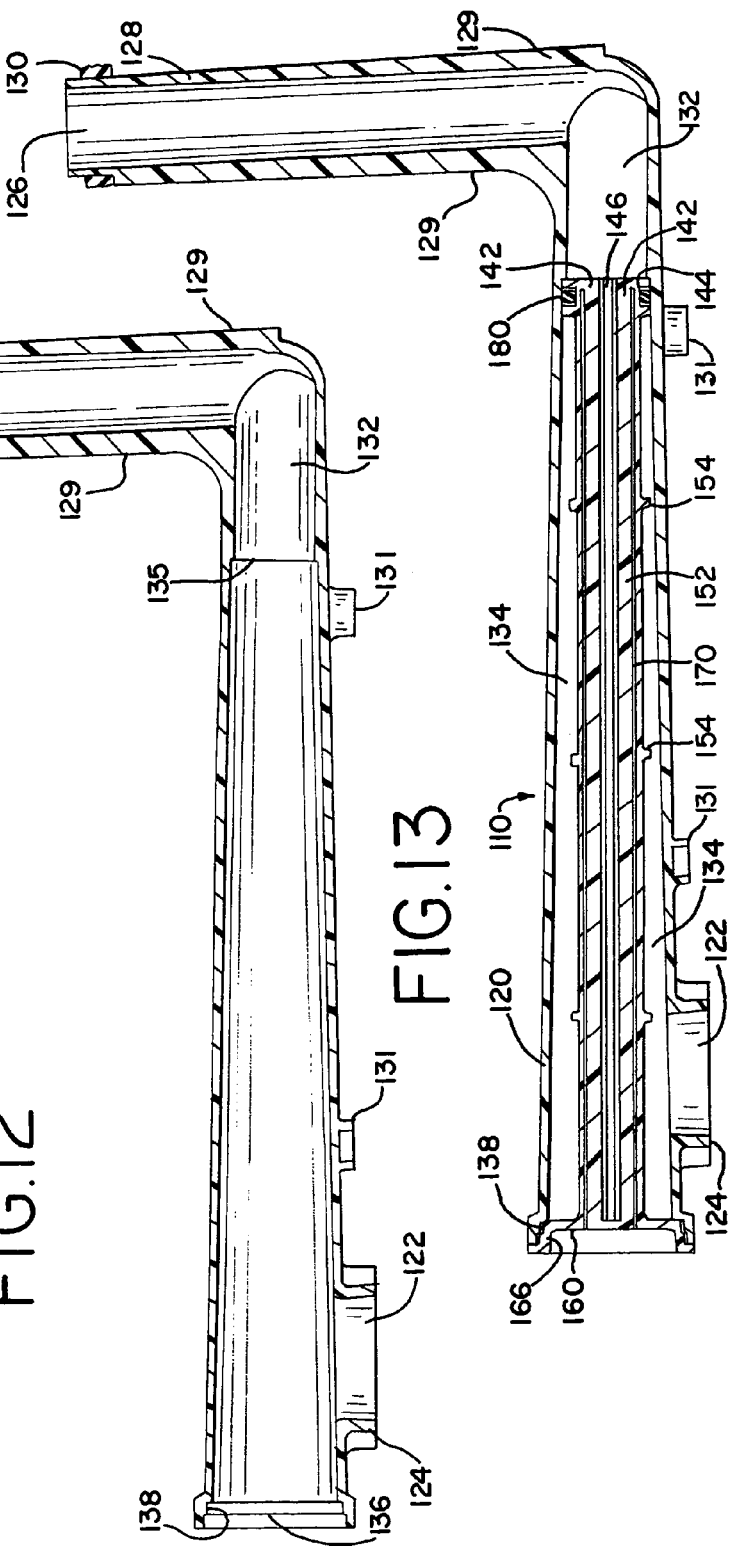

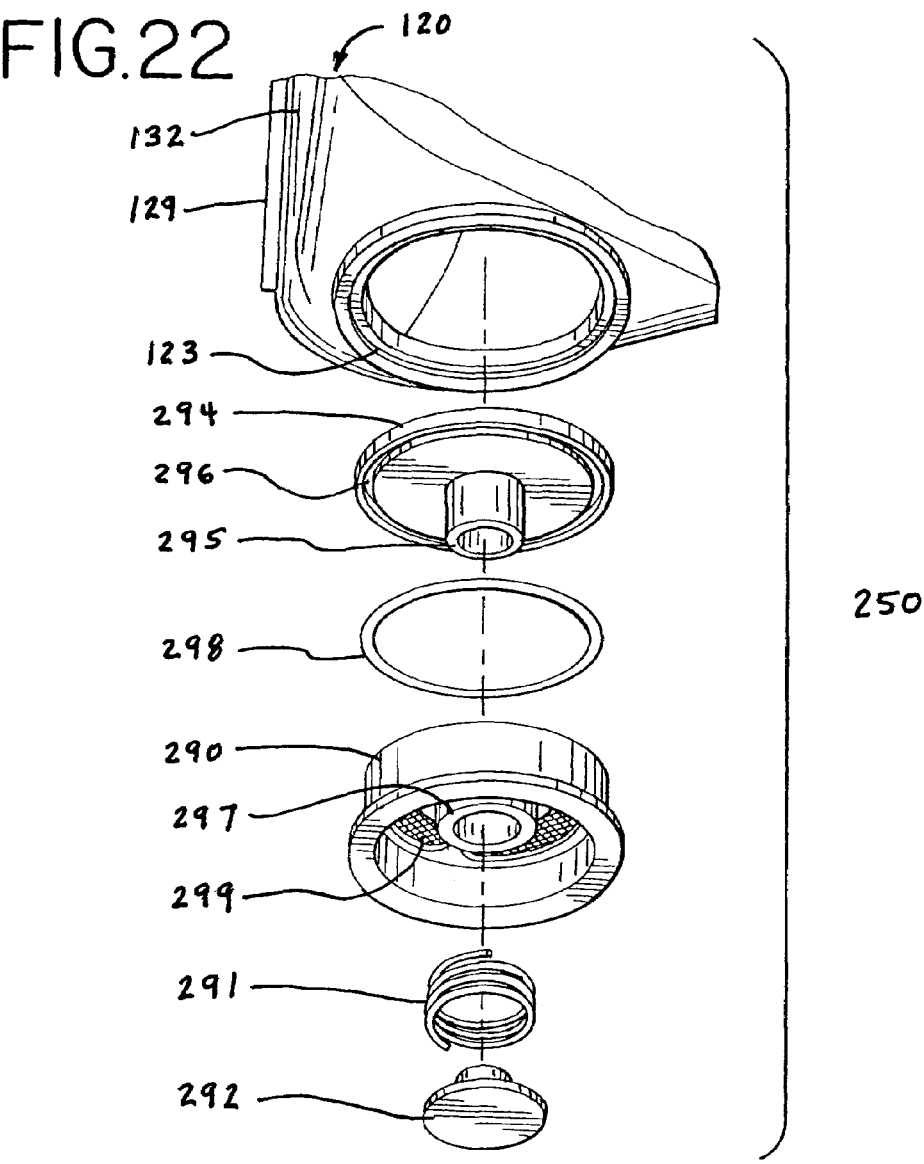
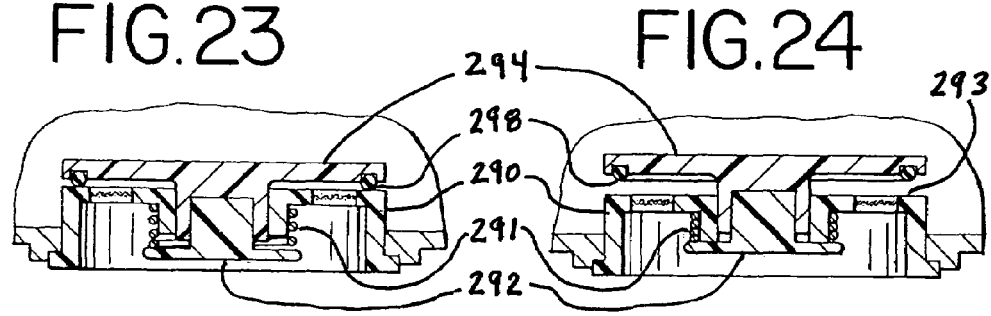

SUMP FILTER WITH FILTER ELEMENT CARTRIDGE

This application is a continuation in part of U.S. application Ser. No. 10/087,119, filed Mar. 1, 2002, now abandoned, which is hereby incorporated herein by reference, which claims the benefit of U.S. Provisional Application No. 60/273,169, filed Mar. 2, 2001, which is hereby incorporated herein by reference.

FIELD OF THE INVENTION

This invention relates to sump filters, and more particularly to filters for use in transmission fluid sumps for motor vehicles.

BACKGROUND OF THE INVENTION

Since the advent of motor vehicles with automatic transmissions using transmission fluids, there has been a need to provide filtered fluid to the automatic transmission assembly. This is because an automatic transmission assembly includes frictional units that couple rotatable members to one or more planetary gear set members, and typically includes one or more fluid actuating devices such as a piston in order to engage and disengage the frictional units, for example. Such an automatic transmission assembly requires not only tight tolerances between components, but also necessarily requires a source of clean lubricating fluid, also known as automatic transmission fluid, for effective and efficient operation.

Various transmission fluid sump filters have been devised to provide a source of automatic transmission fluid that is free of debris or other material deleterious to the proper operation of motor vehicle automatic transmissions. The current desire to minimize the size of sump areas, due to the general desire to reduce the size of all motor vehicle components to lighten motor vehicles for environmental and fuel consumption concerns is at odds with providing a space of sufficient magnitude for a filter surface area sufficient to provide for a source of clean transmission fluid for the serviceable life of the vehicle under various operating conditions including in cold weather. In this latter operating condition, it has been found that the higher viscosity and other properties associated with cold flow of transmission fluid creates an undue and disadvantageous pressure differential across the filtration media that may result in damage to the filtration media and/or filtration assembly that affects its operational functionality and operating life. Consequently, there is a need to provide a transmission fluid sump filter assembly that maximizes the filter surface area under the condition of a reduced sump size, and which is effective for filtering transmission fluid over various operating conditions, including cold flow conditions, and yet relatively economical to fabricate, assemble, and install, and otherwise suited to its intended purpose as an automatic transmission sump filter. This need is of particular significance where a transmission fluid sump is configured as a small space and yet the filtering and dirt holding capacity of the sump filter is expected to match or exceed existing sump filters that are not dimensionally constrained over a variety of operating conditions, including cold flow conditions.

BRIEF SUMMARY OF THE INVENTION

A sump filter assembly has been invented which provides the foregoing and following advantages and meets the above and below described needs, among others. In a first aspect, there is provided is an automatic transmission sump filter assembly in fluid communication with the inlet of an automatic transmission fluid pump comprising a filter housing having a filter chamber, an inlet in fluid communication with the filter chamber, and an outlet in fluid communication with the filter chamber and the inlet of the automatic transmission fluid pump; filtration material forming an envelope; a plastic filter element removably disposed in the filter chamber having at least one edge of the filtration material envelope embedded therein and at least one shoulder adapted to support at least one sealing member; and at least one sealing member disposed on the filter element shoulder, wherein the sealing member is in sealing engagement with the filter housing and the filter element.

In a second aspect, there is provided a sump filter assembly in fluid communication with the inlet of a pump comprising a housing having a chamber, an inlet in fluid communication with the chamber, an outlet in fluid communication with the chamber thereby defining a fluid flow path between the inlet and outlet through the chamber, and an access hole; and a filter element disposed through the housing access hole, the filter element comprising a plastic member having a frame and at least one sealing member retaining shoulder, filtration material, with a portion of the filtration material embedded in the plastic frame, at least one plastic rib attached to the plastic member and supporting the filtration material, and at least one sealing member disposed against the sealing member retaining shoulder and sealingly engaging the housing wall in the housing chamber, whereby the filter element is disposed in the fluid flow path between the housing inlet and outlet to thereby filter sump fluid.

Preferred embodiments of the invention have the distinct advantage of providing an effective sump filter that maximizes the filter surface area under the condition of a reduced sump size, that performs satisfactorily over a range of operating conditions, including cold flow conditions, that is relatively economical to fabricate using conventional mold tooling, and economical to assemble, and install, and is otherwise ideally suited to its intended purpose.

Other features and advantages of the present invention will become more fully apparent from the following description of the preferred embodiments, the appended claims and the accompanying drawings.

BRIEF DESCRIPTION OF SEVERAL VIEWS OF THE DRAWINGS

FIG. 1 is a perspective view of a partially assembled sump filter assembly of a first preferred embodiment of the present invention.

FIG. 2 is an elevational view of an assembled embodiment of the sump filter assembly of FIG. 1.

FIG. 5 is a sectional view taken along line 5-5 of FIG. 2.

FIG. 6 is an enlarged view of the detail A of FIG. 5.

FIG. 7 is a top plan view of a sump filter assembly of a second preferred embodiment of the present invention.

FIG. 8 is a side elevational view of the sump filter assembly of FIG. 7.

FIG. 9 is a fragmentary bottom plan view of the sump filter assembly of FIG. 7.

FIG. 10 is a bottom plan view of a preferred embodiment of the sump filter housing used in the filter assembly of FIG. 7.

FIG. 11 is an elevational view of the sump filter housing of FIG. 10.

FIG. 12 is a sectional view taken along line 12-12 of FIG. 10.

FIG. 13 is a sectional view taken along line 13-13 of FIG. 7.

FIG. 22 is an exploded view of another embodiment of a bypass valve arranged in a fragmentary section of one of the above sump filter housings of the above assemblies.

FIG. 23 is a sectional view of the bypass valve of FIG. 22 in the normally closed condition.

FIG. 24 is a sectional view of the bypass valve of FIG. 22 in an open condition.

DETAILED DESCRIPTION OF EMBODIMENTS OF THE INVENTION

Figure 3:
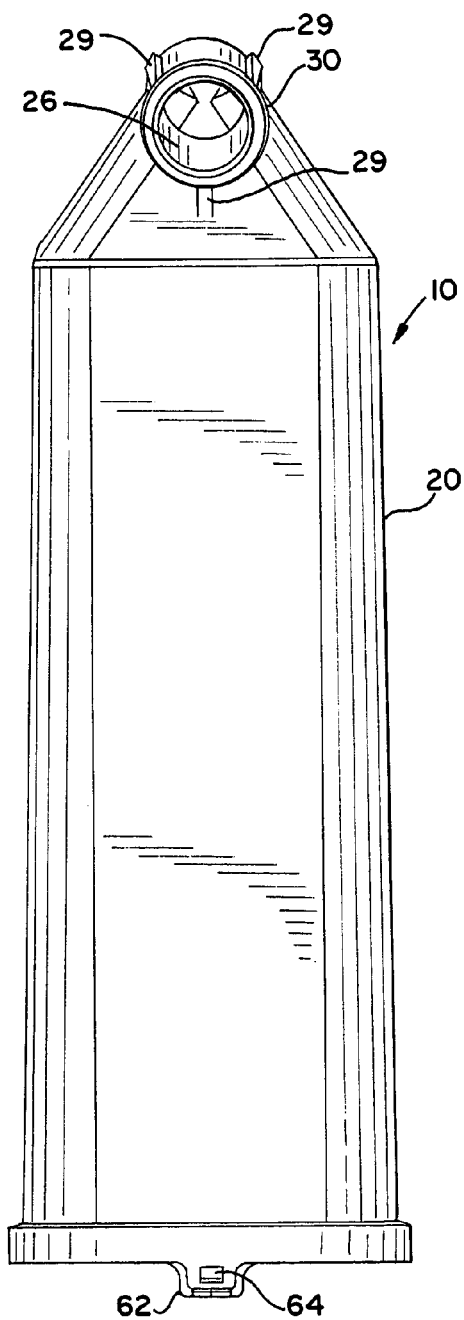
FIG. 3 is a top plan view of the sump filter assembly of FIG. 2.

Referring to the drawings in greater detail, and first to FIGS. 1-6, a sump filter assembly, generally designated 10, is depicted for motor vehicle transmission fluid sump applications. Sump filter assembly 10 is connectable to the inlet of a transmission fluid pump or conduit or the like in fluid communication with the inlet of a transmission fluid pump (not shown), and is disposed in a sump space that collects automatic transmission fluid in a motor vehicle.

Figure 4:
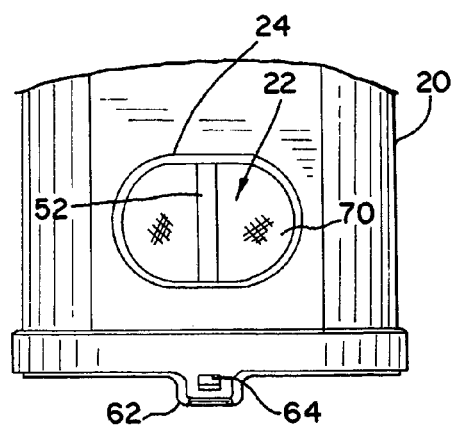
FIG. 4 is a fragmentary bottom plan view of the sump filter assembly of FIG. 2.
Figure 14:
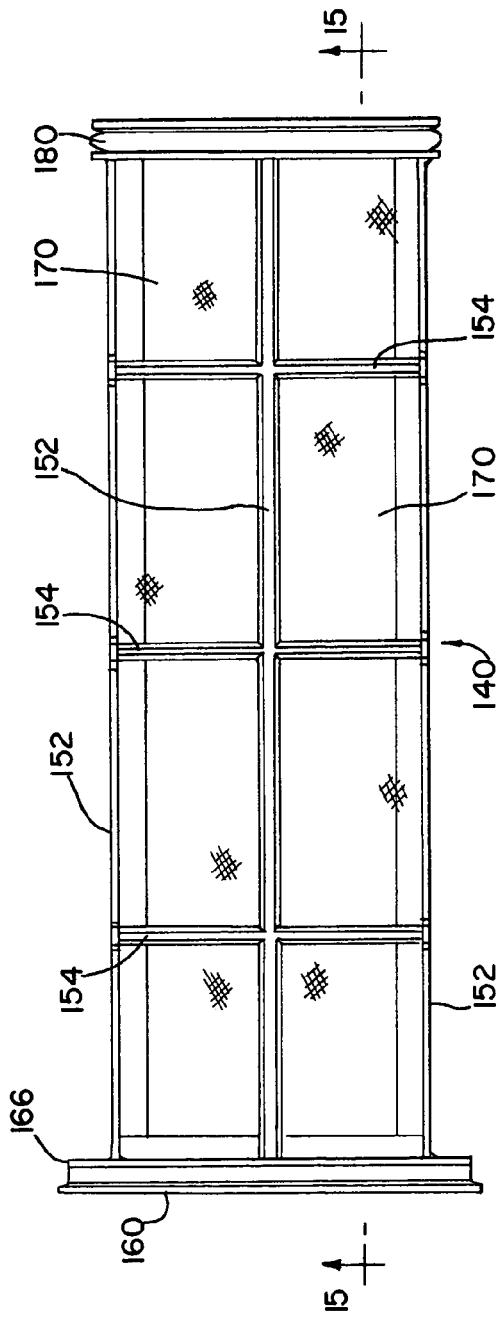
FIG. 14 is a top plan view of a preferred embodiment of the filter element used in the filter assembly of FIG. 7.
Figure 15:
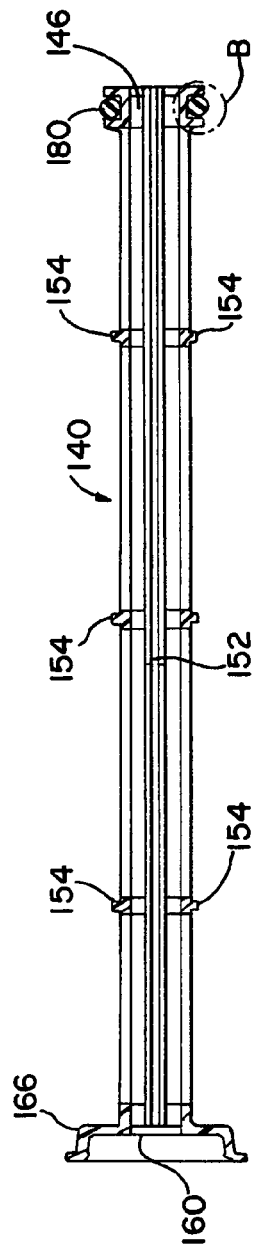
FIG. 15 is a sectional view taken along line 15-15 of FIG. 14.
Figure 16:
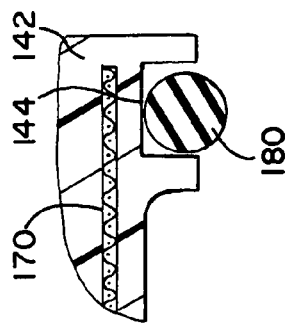
FIG. 16 is an enlarged view of the detail B of FIG. 15.
Figure 17:
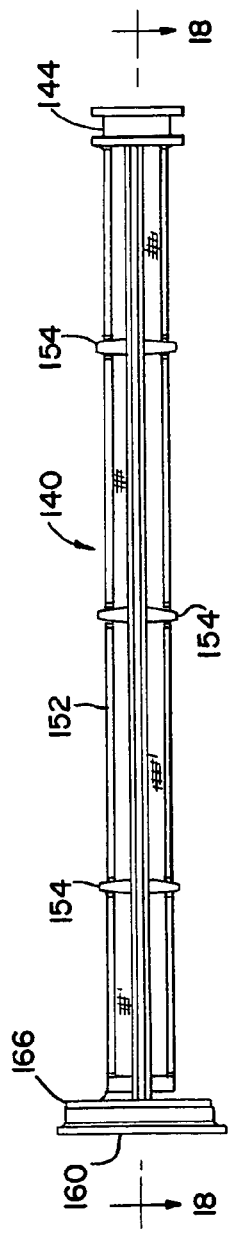
FIG. 17 is an elevational view of the filter element of FIG. 14 with the O-ring removed.
Figure 18:
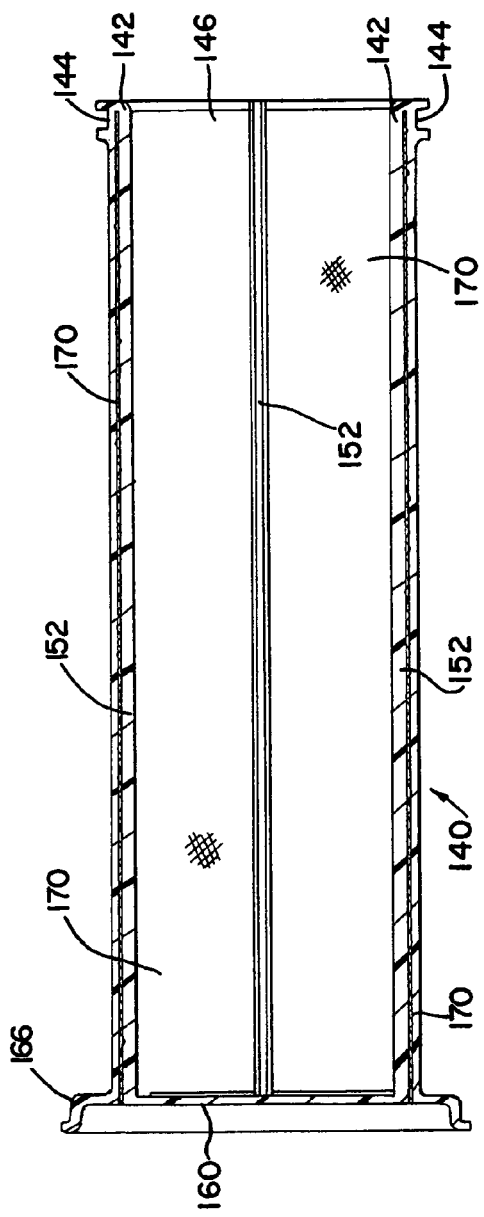
FIG. 18 is a sectional view taken along line 18-18 of FIG. 17.
Figure 19:
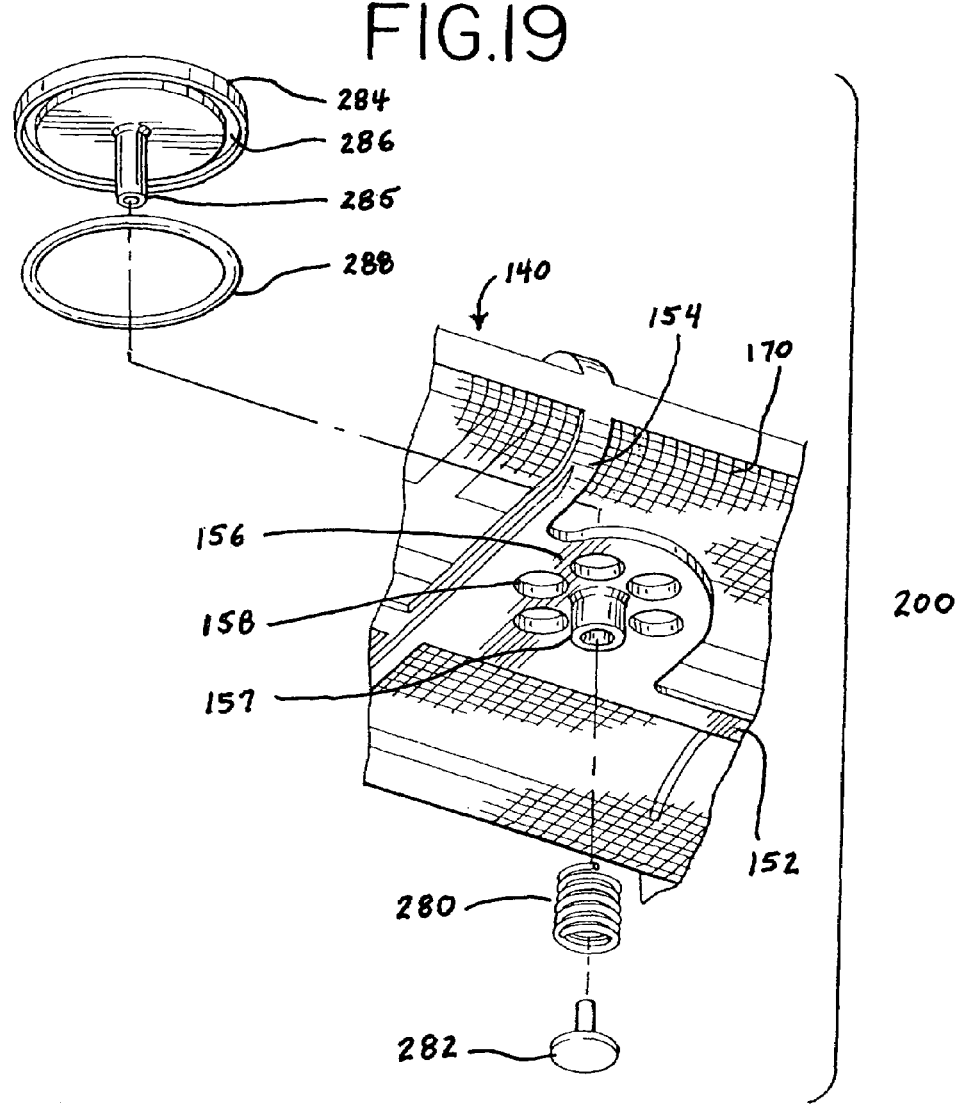
FIG. 19 is an exploded view of one embodiment of a bypass valve arranged in a fragmentary section of one of the above filter elements of one of the above assemblies.

Sump filter assembly 10 includes three main components, namely: housing, generally designated 20; filter element, generally designated 40; and sealing member or O-ring, generally designated 80. Referring to FIGS. 1 and 4, for example, housing 20 includes a main inlet 22 defined by main inlet wall 24. The inlet 22 is in direct fluid communication with the sump for automatic transmission fluid. An outlet 26, defined by outlet wall 28 is also provided, which is in direct fluid communication with a transmission fluid pump inlet or conduit leading to the fluid pump inlet. Outlet 26 is in fluid communication with transition section 32. Housing cavity 34 is in fluid communication with outlet 26 and inlet 22. Housing 20 is also provided with access way or hole 36 for allowing filter element 40 access into housing cavity 34 as will be explained further below.

Filter element 40 includes filtration material 70, formed in the shape of an envelope, with an edge thereof embedded into the frame 42 of filter element 40. Frame 42 includes sealing member or O-ring retaining shoulder 44 that serves to retain sealing member or O-ring 80, as shown in FIG. 5. Frame 42 also provides for frame opening 46 that is in fluid communication with the filter envelope interior and outlet 26.

When filter element 40 is inserted into housing 20 via access 36, as shown in FIG. 1, into the final assembled configuration as shown in FIG. 5, a portion of housing cavity 34 is so dimensioned to receive frame 42 such that sealing member or O-ring 80, which is received within shoulder 44, sealingly engages the housing interior. When fully assembled, sump fluid may be drawn through inlet 22 and into housing cavity 34. Fluid then passes through filtration material 70 and into the material envelope interior, and does not to any appreciable degree pass around O-ring or sealing member 80. Fluid flows from the envelope interior through frame opening 46 and to inlet 26. This assembly thereby places the filtration material in the fluid flow path between inlet 22 and outlet 26 and thus also defines a filtered fluid cavity space in fluid communication with outlet 26 and an unfiltered fluid cavity space in fluid communication with inlet 22.

In the embodiment of FIGS. 1-6, filter element 40 is provided with a plurality of ribs, including longitudinal ribs 52 and lateral ribs 54. Further, in this embodiment, filter element 40 is provided with an end wall member 60 into which an edge of filtration material 70 is embedded. In this embodiment, longitudinal ribs 52, lateral ribs 54, and end wall member 60 form a cage that protects filtration material 70 and may assist in defining the filtration material envelope. This embodiment also provides housing 20 with an outlet seal 30, as well as stiffeners 29, and stand offs 31.

As shown in detail in FIG. 6, an optional feature of this embodiment of the filter element 40 is tab 62 with detent surface 64. Recess 38, that is adjacent access 36, is provided with hole 39 to accommodate detent surface 64 to provide a positive snap fit when the filter element 40 is fully assembled into housing 20.

Also, as shown in detail in FIG. 6, another optional feature of this embodiment of the filter element 40 is an O-ring or sealing member retaining shoulder 64 provided in wall member 60. Shoulder 64 retains O-ring or gasket or sealing member 84, and enables a sealing engagement of this member 84 with recess 38. With this optional feature, there would be no appreciable fluid passing into housing cavity 34 through access 36, for example. The foregoing optional features may be utilized simultaneously in an embodiment, as depicted in FIG. 6, or independently from one another.

The immediately foregoing optional features are directed to the embodiment shown in FIGS. 1-6 wherein the filter element 40 is removable relative to the housing 20. However, in an alternative embodiment, and as can be appreciated by those skilled in the art, filter element 40 is not removably disposed in housing 20, but rather inserted into housing 20, and end wall 60 permanently sealed to housing 20 at an abutting surface therebetween. For example, such permanent seal surfaces are shown in FIG. 6 where end wall member 60 is in abutting relationship to housing 20. Such permanent seals may be effectuated by methods known by those of skill in the art, including, for example, adhesives and bonding agents, or if the pertinent portions of the structures are of the same or compatible thermoplastic materials, the materials can be heat-bonded (fused or melt bonded) together, or solvent bonded together. It is presently preferred to use sonic welding of the pertinent portions of the structures. It is to be noted that if a permanent seal about the periphery of end wall 60 is created, the above noted optional features are not required to effectuate a fluid tight seal about access 36.

FIGS. 7-18 show an alternative and presently preferred embodiment. As is readily noted from these figures, many of the features of the sump filter assembly depicted therein are similar to the features of sump filter assembly 10 (see FIGS. 1-6), and accordingly these similar features have been denoted by numerical designations incremented by 100. Accordingly, when filter element 140 is inserted into housing 120 via access 136, similar to that shown in FIG. 1, and is placed into the final assembled configuration as shown in FIG. 13, a portion of housing cavity 134 is so dimensioned to receive frame 142 such that sealing member or O-ring 180, which is received within O-ring or sealing retaining shoulder 144 (see FIG. 16), sealingly engages the housing interior. When fully assembled, sump fluid may be drawn through inlet 122 and into housing cavity 134. Fluid then passes through filtration material 170 and into the material envelope interior, and does not to any appreciable degree pass around O-ring or sealing member 180. Fluid flows from the envelope interior through frame opening 146 and to inlet 126. This assembly thereby places the filtration material in the fluid flow path between inlet 122 and outlet 126 and thus also defines a filtered fluid cavity space in fluid communication with outlet 126 and an unfiltered fluid cavity space in fluid communication with inlet 122.

In the embodiment shown in FIGS. 7-18, it is presently preferred to use standard plastic injection molding techniques known to those of skill in the art to insert filtration material 170 into an appropriately dimensioned injection mold cavity, and to injection mold a monolithic filter element cage comprising frame 142, ribs 152, 154, and end wall member 160 to the filtration material 170 such that pertinent portions of the filtration material are embedded into the plastic of filter element 140. It is also presently preferred to use standard plastic injection molding techniques to fabricate housing 120. Further, it is preferred to provide housing 120 with internal recess 135 (see FIG. 12) that impedes the extent of insertion of filter element 140 into housing 120 and may assist in defining the housing interior surface against which the sealing member may seal. Also, the O-ring(s) and/or gasket member(s), and outlet seal may be snap fit onto the resulting molded structures prior to final assembly of the sump filter assembly.

Further, it should be appreciated that the embodiment of FIGS. 7-18 may be configured such that the filter element 140 is removably disposed in housing 120. In this configuration, end wall member 160 is provided with flange 166 that abuts against recess 138 when sump filter assembly 110 is fully assembled (see, e.g. FIG. 13). In order to replace the filter element 140, end wall member 160 and/or flange 166 is grasped manually or mechanically to unseal the sealing member or O-ring from the cavity 134 interior and thus remove filter element 140 through access hole 136. Following cleaning of the full cavity 134, if desired, a new or clean filter element 140 may then be inserted into cavity 134 via access 136 to a fully assembled condition such as is shown in FIG. 13.

However, in an alternative embodiment to that depicted in FIGS. 7-18 and as can be appreciated by those skilled in the art, filter element 140 is not removably disposed in housing 120, but rather inserted into housing 120 such that end wall flange 166 abuts against recess 138 of housing 120. A permanent seal may then be formed between the resulting abutting surfaces to permanently seal housing 120 at end wall 160. Such abutting surfaces are depicted in FIG. 13, for example. The permanent seal of this alternative embodiment may be effectuated by methods known to those of skill in the art, including, for example, adhesives and bonding agents, or if the pertinent portions of the structures are of the same or compatible thermoplastic materials, the materials can be heat-bonded (fused or melt bonded) together, or solvent bonded together. Further, permanent seals presently contemplated may be formed by laser weld, hot plate weld, induction weld, or vibration weld. It is presently preferred to use sonic welding of the pertinent portions of the structures, namely sonically welding the perimeter of end wall flange 166 to recess 138 of housing 120 to form a sonic shear weld.

As shown in detail in FIGS. 7-8, an optional feature of this embodiment of the filter housing 120 are lateral stand offs 133. It has been found that standoffs 131 have been useful to locate the sump filter vertically in the sump to optimize fluid flow into the filter cavity, and that lateral standoffs 133 have been useful to locate the sump filter horizontally in the sump and to prevent undue dislocation of the sump filter and its inlet from their intended location during motor vehicle operation.

It will be appreciated that alternatives to the preferred embodiments disclosed herein may be appreciated by those of ordinary skill in the art that will fall within the scope of this invention. For example, although the preferred embodiment depicted herein uses a nylon 66, 30% glass filled for the housing, ribs, end wall, O-ring or sealing member retaining shoulder(s), and frame of the filter element, other plastics may be used. Exemplary materials include other nylon or polyester, glass filled, or other thermoplastic synthetic resins suitable for the operating environment and temperature extremes expected for the assembly. Also, although the filtration material for the preferred embodiment herein is a woven polyester monofilament rated at retaining 150 micron particles or larger, the composition and rating of the material may vary. Exemplary filtration materials include spun bond polyester media, polyester depth media, stainless steel mesh, nylon mesh or depth media, cellulosic material, or the like, and may be flat screen or pleated. Further, the media can be configured not only as an oval or elliptical cylinder, but also as a cone, frustum, or frusto-conical.

Moreover, although the filtration material of the preferred embodiment is embedded into the plastic of the filter element member, ribs, and end wall using a typical injection molding process, the filtration material may be attached to the salient portions of the filter element by other means. For example, adhesives and bonding agents can be used, or if the filtration material and the salient portions of the filter element cage are of the same or compatible thermoplastic materials, the materials can be heat-bonded (fused or melt bonded) together, or solvent bonded together, thus assuring an attachment between the materials.

Similarly, the filtration material may be formed into an envelope, with the edge or perimeter of the envelope that opens into the interior of the envelope being embedded into a filter element frame of any geometric form, such as a rectangle, oval, ellipse, circle or the like, with an O-ring or gasket member or sealing member retained about the frame. One or more plastic ribs or similar members may be further attached to the filter element frame to assure that the filtration material envelope does not collapse upon itself during filter assembly operation, and these ribs may be attached to the frame using suitable methods, including, for example, adhesives and bonding agents, or if the ribs and the salient portions of the frame are of the same or compatible thermoplastic materials, the materials can be heat-bonded (fused or melt bonded) together, or solvent bonded together. Further, the filtration material may be attached to one or more end wall members distinct from the frame to assure that the envelope does not collapse during filter assembly operation, and the attachment of the end wall to the frame and/or the ribs may be by way of similar attachment methods indicated above for the ribs. Thus, although the preferred embodiment is directed to a monolithically molded plurality of ribs in conjunction with an end wall and a frame with the filtration material envelope opening embedded into the frame, other attachment methods for attaching these structures together to form the filter element are expressly contemplated herein.

It is also to be noted that in all embodiments there is at least one sealing member that provides a seal preventing particles of 1 micron or more from passing between the housing cavity dirty space to the clean space. Such a sealing member includes an O-ring or gasket member that ensures a fluid tight seal between the filter element and the housing to separate the housing cavity into a dirty and clean fluid space. Sealing members other than O-rings or gasket members of synthetic or natural composition are expressly contemplated herein, such as one or more beads of silicone caulk or silicone based materials, or blade like structures either abutting against walls or overlapping one another or structures forming a cup seal or the like. Similarly, a plurality of separable O-rings and/or gasket members, or combination thereof, is also expressly contemplated herein as providing an appropriate seal as a sealing member.

Further, although the preferred composition of the O-ring or gasket member is an ethylene/acrylic elastomer based compound, and in particular compounds using Vamac® which is generally commercially available from E. I. Du Pont de Nemours and Co., other materials may be used that are suitable for the operating environment and temperature extremes expected for the assembly. Exemplary materials may also include fluoroelastomer compounds, such as compounds using Viton® which is generally commercially available from DuPont Dow Elastomers L.L.C., or nitrile rubber, or neoprene, or similar elastomers may be suitably used for the operating environment and temperature extremes expected for the assembly. Furthermore, as for the configuration of the O-ring or gasket member, although the preferred embodiment is configured having circular cross-section, other geometries are contemplated, including an O-ring or gasket member of square or rectangular cross-section for example. Also in this regard, those of ordinary skill in the art may appreciate that a lubricant on the O-ring or gasket member may be used to assist with the assembly of the preferred embodiment into a fluid tight configuration, with such lubricants including a polytetrafluoroethylene (PTFE) coating or transmission fluid thereon. Similarly, the preferred embodiment includes an outlet seal, and this outlet seal is preferably of similar composition to the O-ring or gasket member discussed above.

Still further, and with reference to FIGS. 19-24, bypass valves 200, 250 may be provided in the above described transmission sump filter assembly. In the embodiment shown in FIGS. 19-21, filter element 140, which is provided with ribs, such as a longitudinal rib 152 and lateral rib 154, is further provided with valve seat portion 156, which is provided with one or more flow apertures 158 and further may include valve stem aperture 157. Valve plate 284, which may include valve stem 285 and sealing member retainer 285 that retains sealing member 288, such as an O-ring, is inserted into the filter material envelope through filter member or frame opening 146, and valve stem 285 may be received in valve stem aperture 157. Biasing member 280 is received over valve stem 285 and/or a portion of valve plate retention member 282, and valve plate retention member 282 is affixed to valve plate 284. Biasing member 280 is sized to bias valve plate 284 into a normally closed position over a range of temperatures for the transmission oil during normal operation of the transmission and vehicle, i.e. when the vehicle transmission is not in a cold engine start condition.

Figures 20, 21:
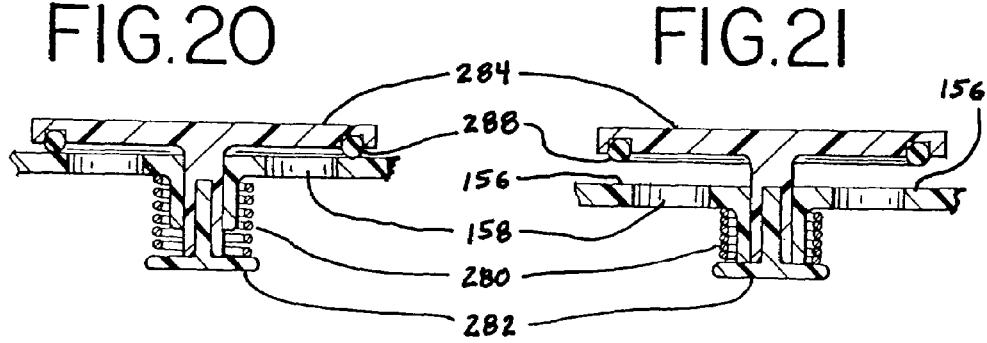
FIG. 20 is a sectional view of the bypass valve of FIG. 19 in the normally closed condition.
FIG. 21 is a sectional view of the bypass valve of FIG. 19 in an open condition.

In normal operation, when the vehicle transmission is not in a cold engine start condition, and with reference to FIG. 20, bypass valve assembly 200 is normally closed by way of biasing member 280 biasing valve plate 284 toward valve seat portion 156 and thereby separates the interior of the filter material envelope, the filtered fluid cavity space, from the unfiltered fluid cavity space that is in fluid communication with inlet 122 and the sump. However, when the vehicle transmission is in a cold engine start condition, particularly in below freezing or other conditions when the transmission oil is below ambient summer time conditions, the transmission oil pump applies substantial suction pressure that places a higher than normal pressure differential on the filter material envelope and filter member. Under such pressure differential, and with reference to FIG. 21, valve plate 284 translates longitudinally to permit transmission fluid to pass from the unfiltered cavity through one or more flow apertures 158 to the filtered cavity and thereby relieve the stress on the filter cartridge assembly due to the cold start condition.

In the embodiment shown in FIGS. 22-24, housing 120, which is provided with transition section 132 that is in fluid communication with a transmission fluid pump suction inlet, includes hole 123 for affixing bypass valve assembly 250 into housing 120. Bypass valve housing 290 includes valve seat portion 293, and is provided with one or more flow apertures 299 and further may include valve stem aperture 297. Valve plate 294, which may include valve stem 295 and sealing member retainer 296 that retains sealing member 298, such as an O-ring, is inserted through bypass valve housing 290, and valve stem 295 may be received in valve stem aperture 297. Biasing member 291 is received over valve stem 295 and/or a portion of valve plate retention member 292, and valve plate retention member 292 is affixed to valve plate 296. Biasing member 291 is sized to bias valve plate 294 into a normally closed position over a range of temperatures for the transmission oil during normal operation of the transmission and vehicle, i.e. when the vehicle transmission is not in a cold engine start condition.

In normal operation, when the vehicle transmission is not in a cold engine start condition, and with reference to FIG. 23, bypass valve assembly 250 is normally closed by way of biasing member 291 biasing valve plate 294 toward valve seat portion 293 and thereby separates the interior of the filter material envelope, the filtered fluid cavity space, from the unfiltered fluid cavity space that is in fluid communication with inlet 122 and the sump. However, when the vehicle transmission is in a cold engine start condition, particularly in below freezing or other conditions when the transmission oil is below ambient summer time conditions, the transmission oil pump applies substantial suction pressure that places a higher than normal pressure differential on the filter material envelope and filter member. Under such pressure differential, and with reference to FIG. 24, valve plate 294 translates longitudinally to permit transmission fluid to pass from the unfiltered cavity through one or more flow apertures 299 to the filtered cavity and thereby relieve the stress on the filter cartridge assembly due to the cold start condition.

As to bypass valve assemblies 200, 250, valve seat portion 156 is preferably monolithically molded with ribs 152, 156. Valve assembly housing 290 may be the same or similar plastic as housing 20, 120, and valve plate 284, 294 and valve plate retention member 282, 292 may be the same or similar plastic as well. The selection of the plastic utilized is within the ordinary skill with reference to the operating conditions and affixation method employed as between components. Sealing member 288, 298 may be composed of the same or similar material as sealing member 80, 180, and again may be readily selected by those of ordinary skill with reference to the operating conditions and components sealed. Biasing member 280, 291 may be of spring steel, stainless steel, or suitable plastic for the operating conditions as may be selected by those of ordinary skill. If desired, filtration material with a mesh size that allows particles to pass therethrough substantially larger than the mesh size of filtration material 70, 170 (or otherwise having substantially greater flow characteristics in a cold start condition than that of filtration material 70, 170) may be interposed in one more flow apertures 158, 299 including for example, by way of embedding the material in the plastic of the valve seat portion 156 or the valve housing 290, or by other affixation methods such as glue, or sonic, vibration, or hot weld. Such affixation methods may also be utilized to affix valve plate 284, 296 to valve plate retention member 282, 292, and to affix bypass valve assembly 250 to the perimeter of hole 123. Further, one or more flow apertures 152, 299 may restrain lateral translation of valve plate retention member 282, 292, and valve plate retention member 282, 292 may be affixed to valve plate 284, 294 to restrain longitudinal valve translation, and thus valve stem 285, 295 and valve stem aperture 157, 297 may be optional in the bypass valve assemblies 200, 250. Biasing member 280, 291 may be of a configuration other than a helical spring, such as a flat spring, or other spring suitably designed for this biasing application.

The disclosed and claimed sump filter assembly has numerous advantages. The disclosed filter assembly by means of its construction involves a relatively simple manufacturing apparatus, yet provides a satisfactory resulting filter with an acceptable filtration rating and dirt holding capacity. Further, the disclosed apparatuses may be produced using a relatively uncomplicated manufacturing environment using typical injection molding machines. In view of the above disclosure, for example, those of ordinary skill in the art would appreciate that stiffeners 129 extending along the exterior of the transition section that discontinue short of the tubular end of the transition section locates the sealing member so as to be appropriately between the filter assembly and the transmission pump inlet and thus the housing can be molded easily and does not require an undercut or the like in the tubular end for the sealing member. The disclosed sump filter assembly is economical to produce and results in an efficiently performing filter assembly suitably configured for its intended sump filtering application.

Further, the disclosed and claimed sump filter assembly includes bypass valve assembly 200, 250. With the normally closed bypass valve assembly 200, 250, operation of the filter assembly typically provides for sump fluid passing through filtration material as generally described above, from the dirty sump area to the filtration envelope interior thereby providing a clean filtration envelope interior cavity. The bypass valve assembly 200, 250 provides for a bypass during cold start and cold transmission fluid conditions of a vehicle so as to reduce the pressure differential across the filter member element and thereby advantageously relieve stress on the filter cartridge assembly and the transmission sump pump system.

While the preferred embodiments of the aspects of the invention have been disclosed, it is to be understood that the invention is not limited to the disclosed examples or their disclosed use. Modifications of design in addition to those discussed can be made without departing from the invention. The scope of the invention is accordingly indicated in the appended claims and all changes that come within the meaning and range of equivalency of the claims are therefore intended to be embraced therein. Thus, while the invention has been described with reference to particular embodiments, modification of structure, materials and the like will be apparent to those skilled in the art, yet still fall within the scope of the invention.

What is claimed is:

1. An automatic transmission sump filter assembly in fluid communication with the suction inlet of an automatic transmission fluid pump comprising:

(a) a filter housing having a base portion with a bottom portion and a filter chamber, an inlet through the bottom portion in fluid communication with the sump and in fluid communication with the filter chamber, and an outlet member portion having a longitudinal axis and angularly extending from the base portion and defining an outlet at an end thereof in fluid communication with the filter chamber and the tubular inlet of the automatic transmission fluid pump, wherein the outlet member portion includes one or more stiffeners extending linearly and parallel with said axis along the exterior of the outlet member portion from proximate said base and terminating before the outlet member to form one or more stiffener ends; p1 (b) at least one outlet sealing member disposed on the outlet member portion and engaged against the end of one or more stiffeners of the outlet member, wherein the outlet sealing member is in sealing engagement with the outlet member and the automatic transmission fluid pump inlet, and wherein the outlet sealing member abuts one or more stiffener ends;

(c) filtration material forming an envelope;

(d) a ribbed plastic filter element, removably disposed in the filter chamber, having at least one edge of the filtration material envelope embedded therein, at least one rib supporting the filtration material, and at least one shoulder adapted to receive at least one sealing member; and (e) at least one sealing member disposed in the filter element shoulder, wherein the sealing member is in a first sealing engagement with the filter housing and the filter element, whereby the filter chamber is divided by the filtration material, filter element, and sealing member into a clean transmission oil chamber that communicates with the suction inlet of the transmission fluid pump and a dirty transmission oil chamber that directly communicates with the sump via the inlet in the bottom of the base portion.

2. The automatic transmission sump filter assembly of claim 1 further comprising at least one bypass valve arranged on the ribbed plastic filter element wherein the bypass valve is normally closed and opens when the pressure differential between the clean transmission oil chamber of the filter envelope interior and the dirty transmission oil chamber outside of the filter envelope exceeds a preselected pressure differential.

3. The automatic transmission sump filter assembly of claim 2, wherein the bypass valve has one or more apertures with filtration material in at least one aperture.

4. The automatic transmission sump filter assembly of claim 2 wherein the sealing member comprises at least one O-ring, and the shoulder is adapted to retain the at least one O-ring.

5. The automatic transmission sump filter assembly of claim 4 wherein the ribbed plastic filter element further comprises an end wall member and at least a portion of the end wall member comprises a sealing member retaining shoulder adapted to receive at least one sealing member or O-ring and disposed about the periphery of the end wall, and further comprising at least one sealing member or O-ring disposed in the end wall retaining shoulder, wherein the sealing member or O-ring is in a second sealing engagement with the filter housing and the filter element.

6. The automatic transmission sump filter assembly of claim 5 wherein the filtration material comprises polyester.

7. The automatic transmission sump filter assembly of claim 1, further comprising at least one bypass valve arranged on the bottom portion of the housing base adjacent the clean transmission oil chamber and wherein the bypass valve is normally closed and opens when the pressure differential between the clean transmission oil chamber of the housing interior and the sump outside of the bottom portion of the housing base adjacent the bypass valve exceeds a preselected pressure differential.

8. The automatic transmission sump filter assembly of claim 7 wherein the sealing member comprises at least one O-ring, and the retaining shoulder is adapted to receive at least one O-ring.

9. The automatic transmission sump filter assembly of claim 8 wherein the filtration material comprises polyester.

10. The automatic transmission sump filter assembly of claim 9 wherein the ribbed plastic filter element further comprises an end wall member that includes a sealing member retaining shoulder adapted to receive at least one sealing member and disposed about the periphery of the end wall, and further comprising at least one sealing member disposed in the end wall retaining shoulder, wherein the sealing member is in a second sealing engagement with the filter housing and the filter element.

11. The automatic transmission sump filter assembly of claim 1 further comprising at least one bypass valve arranged on the bottom portion of the housing base adjacent the clean transmission oil chamber and wherein the bypass valve is normally closed and opens when the pressure differential between the clean transmission oil chamber of the housing interior and the sump outside of the bottom portion of the housing base adjacent the bypass valve exceeds a preselected pressure differential, and wherein the bypass valve has one or more apertures with filtration material in at least one aperture.

12. The automatic transmission sump filter assembly of claim 11, wherein the filtration material comprises polyester.

13. The automatic transmission sump filter assembly of claim 12 wherein the sealing member comprises at least one O-ring, and the shoulder is adapted to receive the at least one O-ring.

14. The sump filter assembly of claim 13 wherein the ribbed plastic filter element further comprises an end wall member that includes a sealing member retaining shoulder adapted to receive at least one sealing member and disposed about the periphery of the end wall, and further comprising at least one sealing member disposed in the end wall retaining shoulder, wherein the sealing member is in a second sealing engagement with the filter housing and the filter element.

15. A sump filter assembly in fluid communication with the inlet of a pump comprising:
(a) a housing having a bottom portion, one or more stand off members extending generally parallel to the bottom portion and adapted to engage the sump, and a chamber, an inlet through the bottom portion in fluid communication with the sump and in fluid communication with the chamber, an outlet member portion having a longitudinal axis and angularly extending from the housing and defining an outlet at an end thereof in fluid communication with the chamber thereby defining a fluid flow path between the inlet and outlet through the chamber, and an access hole, and wherein the outlet member portion includes one or more stiffeners extending linearly and parallel with said axis along the exterior of the outlet member portion from proximate said housing and terminating before the outlet member to form one or more stiffener ends;
(b) at least one outlet sealing member disposed on the outlet member portion and engaged against the end of one or more stiffeners of the outlet member, wherein the outlet sealing member is in sealing engagement with the outlet member and the pump inlet, and wherein the outlet sealing member abuts one or more stiffener ends; and
(c) a filter element disposed through the housing access hole, the filter element comprising:
(i) a ribbed plastic member having a frame and at least one sealing member retaining shoulder,
(ii) filtration material, with a portion of the filtration material embedded in the ribbed plastic frame and supported by one or more plastic ribs, and
(iii) at least one sealing member disposed against the sealing member retaining shoulder and sealingly engaging the housing wall in the housing chamber, whereby the filter element is disposed in the fluid flow path between the housing inlet and outlet to thereby filter sump fluid into a clean fluid cavity.

16. The sump filter assembly of claim 15 further comprising at least one bypass valve arranged on the ribbed plastic member wherein the bypass valve is normally closed and opens when the pressure differential between the clean transmission oil chamber of the filter envelope interior and the dirty transmission oil chamber outside of the filter envelope exceeds a preselected pressure differential.

17. The sump filter assembly of claim 16 wherein the sealing member comprises at least one O-ring, and the shoulder is adapted to receive the at least one O-ring.

18. The sump filter assembly of claim 17, wherein the filter element further comprises an end wall member attached to at least one plastic rib integral with the plastic member, whereby the plastic end wall member extends through the housing access hole.

19. The sump filter assembly of claim 18 wherein a portion of the filtration material is embedded into the end wall member.

20. The sump filter assembly of claim 19 wherein the plastic member, the end wall member, and at least one plastic rib are monolithically molded.

21. The sump filter assembly of claim 20, further comprising a plurality of plastic ribs extending between the plastic member and the end wall member, whereby a rib cage support structure for filtration material is formed.

22. The sump filter assembly of claim 21 wherein the filtration material comprises polyester.

23. The sump filter assembly of claim 22 wherein the end wall member further comprises a sealing member retaining shoulder adapted to receive at least one sealing member and disposed about the periphery of the end wall, and further comprising at least one sealing member disposed in the end wall retaining shoulder, wherein the sealing member is in sealing engagement with the filter housing and the filter element.

24. The sump filter assembly of claim 23 wherein at least one sealing member is at least one gasket member.

25. The sump filter assembly of claim 15, wherein the filter element is accessible from the housing access hole, removably disposed in the housing, and the filter element further comprises an end wall member monolithically molded with the at least one plastic rib, with a portion of the filtration material embedded into the end wall member.

26. The sump filter assembly of claim 25 further comprising at least one bypass valve arranged on the bottom portion of the housing base adjacent the clean fluid cavity and wherein the bypass valve is normally closed and opens when the pressure differential between the clean fluid cavity and the and the sump outside of the bottom portion adjacent the bypass valve exceeds a preselected pressure differential.

27. The sump filter assembly of claim 26 wherein the end wall member comprises a sealing member retaining shoulder adapted to receive at least one sealing member and disposed about the periphery of the end wall, and further comprising at least one sealing member disposed in the end wall sealing member retaining shoulder, wherein the sealing member is in sealing engagement with the filter housing and the filter element.

28. The sump filter assembly of claim 27 wherein the filtration material comprises polyester.

29. The sump filter assembly of claim 28 wherein at least one sealing member comprises at least one O-ring.

30. The sump filter assembly of claim 15 further comprising at least one bypass valve arranged on the bottom portion of the housing adjacent the clean fluid chamber and wherein the bypass valve is normally closed and opens when the pressure differential between the clean fluid chamber of the housing interior and the sump outside of the bottom portion of the housing adjacent the bypass valve exceeds a preselected pressure differential, and wherein the bypass valve has one or more apertures with filtration material in at least one aperture.

31. The sump filter assembly of claim 30, wherein the filter element is sonically welded to the housing access hole perimeter and the filter element further comprises an end wall member attached to the at least one plastic rib with a portion of the filtration material embedded into the end wall member.

32. The sump filter assembly of claim 31 wherein a portion of the filtration material is embedded into at least one plastic rib, and the plastic member, at least one plastic rib, and the end wall member are monolithically molded plastic.

33. The sump filter assembly of claim 32 wherein the filtration material comprises polyester.

34. The sump filter assembly of claim 32 wherein the filtration material comprises nylon, stainless steel, or cellulose.

35. The sump filter assembly of claim 15 wherein the filtration material comprises polyester, nylon, stainless steel or cellulose, and further comprising at least one bypass valve arranged on the ribbed plastic member wherein the bypass valve is normally closed and opens when the pressure differential between the clean transmission oil chamber of the filter envelope interior and the dirty transmission oil chamber outside of the filter envelope exceeds a preselected pressure differential, and wherein the bypass valve has one or more apertures with filtration material in at least one aperture.

36. The sump filter assembly of claim 35 wherein the at least one sealing member comprises at least one O-ring.

37. The sump filter assembly of claim 36, wherein the filter element further comprises an end wall member attached to the at least one plastic rib.

38. The sump filter assembly of claim 37 wherein the plastic member, at least one plastic rib, and the end wall member are monolithically molded plastic.

39. The sump filter assembly of claim 38 wherein the end wall member comprises an O-ring retaining shoulder adapted to receive at least one O-ring and disposed about the periphery of the end wall, and further comprising at least one O-ring disposed in the end wall O-ring retaining shoulder, wherein the O-ring is in sealing engagement with the filter housing and the filter element.

40. The sump filter assembly of claim 15 wherein the plastic member, at least one plastic rib, and the end wall member are monolithically molded plastic.

* * * * *

UNITED STATES PATENT AND TRADEMARK OFFICE
CERTIFICATE OF CORRECTION

PATENT NO. : 7,282,140 B2                                               Page 1 of 1
APPLICATION NO. : 10/932887
DATED : October 16, 2007
INVENTOR(S) : Andrew J. Boast et al.

It is certified that error appears in the above-identified patent and that said Letters Patent is hereby corrected as shown below:

In column 10, claim 1, line 28, after "stiffener" replace "ends: p1 (b)" with --ends: (b)--.

Signed and Sealed this

Twenty-first Day of September, 2010

David J. Kappos
*Director of the United States Patent and Trademark Office*